(12) United States Patent
Valenci (10) Patent No.: US 7,784,095 B2
(45) Date of Patent: Aug. 24, 2010

(54) VIRTUAL PRIVATE NETWORK USING DYNAMIC PHYSICAL ADAPTER EMULATION

(75) Inventor: Moshe Valenci, Givat-Zeev (IL)

(73) Assignee: Intel Corporation, Santa Clara, CA (US)

( * ) Notice: Subject to any disclaimer, the term of this patent is extended or adjusted under 35 U.S.C. 154(b) by 1385 days.

(21) Appl. No.: 11/221,519

(22) Filed: Sep. 8, 2005

(65) Prior Publication Data

US 2007/0056032 A1    Mar. 8, 2007

(51) Int. Cl.
*G06F 9/00* (2006.01)
*G06F 15/16* (2006.01)
*G06F 17/00* (2006.01)

(52) U.S. Cl. .............................. 726/15; 726/11; 726/12; 726/14

(58) Field of Classification Search .................... 726/15, 726/11, 12, 14
See application file for complete search history.

(56) References Cited

U.S. PATENT DOCUMENTS

| 6,907,042 B1* | 6/2005 | Oguchi ....................... 370/412 |
| 2006/0005008 A1* | 1/2006 | Kao ........................... 713/153 |
| 2006/0072527 A1* | 4/2006 | Beck et al. .................. 370/338 |
| 2007/0113276 A1* | 5/2007 | Shoji et al. .................. 726/17 |

* cited by examiner

*Primary Examiner*—Christopher J Brown
(74) *Attorney, Agent, or Firm*—Blakely, Sokoloff, Taylor & Zafman LLP (57) ABSTRACT

An embodiment of the present invention is a technique to provide secure Virtual Private Network (VPN) connection. A VPN connection is established to a remote gateway via a network adapter using a Firmware on a platform. An event is generated to notify an operating system (OS) network driver through a bus interface port. A request from the OS network driver is responded to provide network information.

20 Claims, 5 Drawing Sheets

VIRTUAL PRIVATE NETWORK USING DYNAMIC PHYSICAL ADAPTER EMULATION

BACKGROUND

1. Field of the Invention

Embodiments of the invention relate to the field of networking, and more specifically, to virtual private networks.

2. Description of Related Art

A virtual private network (VPN) is a private communication network usually used within a corporate entity over a public network. The VPN network traffic is usually carried on public networking infrastructure using standard protocols. A VPN typically employs some combination of encryption, digital certificates, strong user authentication and access control to provide security to the traffic it carries. It usually provides connectivity to many machines behind a gateway or firewall.

Current VPN client software runs as a service or application that is dependent on the operating system operating on the platform. The VPN client software interacts with a remote VPN service. It usually manages a virtual network adapter software driver that assists in connecting to the remote network. One of the problems with the existing VPN software is that it is vulnerable to attacks that compromise network security. It may be open for reverse engineering that may extract secrets.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to provide secure Virtual Private Network (VPN) connection between a client and a remote gateway or corporate network server. A VPN connection is established to a remote gateway via a network adapter using a combination of hardware and Firmware components on a platform. An event is generated to notify an operating system (OS) network driver through a bus interface port. A request from the OS network protocol driver is responded to provide network information.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to provide secure VPN communication using embedded Firmware installed on the client's platform. The Firmware contains programs or instructions that dynamically emulate a network adapter at a bus interface port. A VPN connection is established without using the OS software or driver. After the VPN connection is established, communication between the client and the remote gateway may be performed using the standard software and drivers in the OS and the Firmware components. The network secrets such as authentication components are embedded in the Firmware, avoiding intrusion or malicious attacks.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., Flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a Flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

Figure 1A:
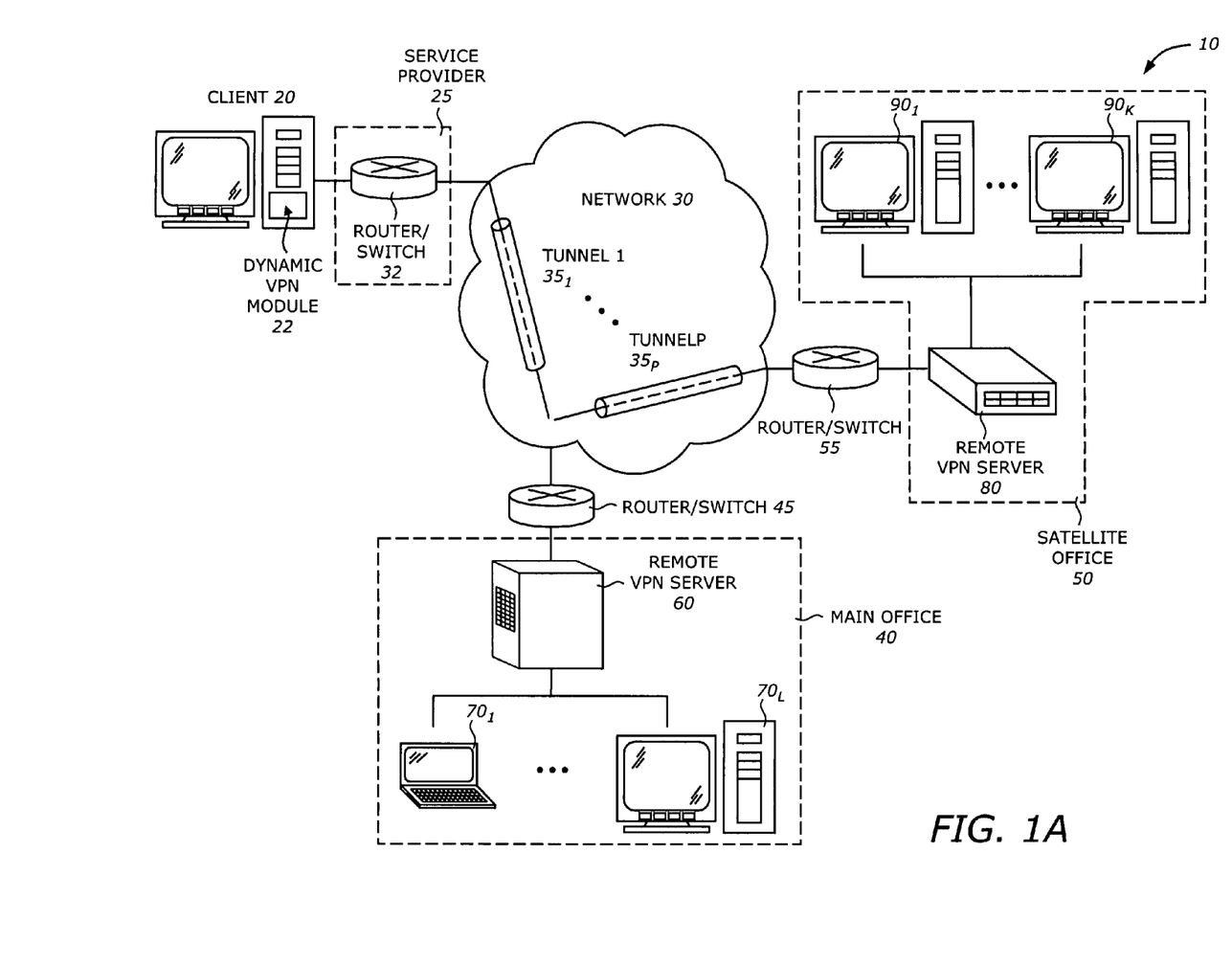
FIG. 1A is a diagram illustrating a system in which one embodiment of the invention can be practiced.

FIG. 1A is a diagram illustrating a system 10 in which one embodiment of the invention can be practiced. The system 10 includes a client 20, a network 30, a main office 40, and a satellite office 50. Note that the system 10 may contain more or less than the above components.

The client 20 is a device that may connect to the network 30 to access the main office 40 or the satellite office 50. It may be a notebook personal computer (PC), a laptop PC, a desktop PC, a personal digital assistant (PDA), a mobile device, or any device that has a network interface and software to provide network communication. In particular, the client 20 includes a dynamic VPN module 22. The dynamic VPN module 22 establishes a VPN connection in a highly secured manner. It interacts with generic or standard network software components but keeps network security information in Firmware residing on the platform of the client. Therefore, intrusion or attacks to compromise network security may be avoided. The client 20 typically connects to the network 30 via a service provider 25 such as an Internet service provider (ISP) via dial-up, broadband, or wireless connection. The service provider 25 typically has a router or switch 32 to allow the client 20 to connect to the network 30.

The network 30 is any public network such as the Internet or a telephone network. It may be a Local Area Network (LAN), a Wide Area Network (WAN), a wireless fidelity (Wi-Fi) network. In particular, it provides a point-to-point link between the client 20 and the main office 40. To establish a point-to-point link, the data is encapsulated, or wrapped, with a header that provides routing information. In addition, the data being sent is typically encrypted for security and confidentiality. The network 30 may include P tunnels $35_1$ to $35_P$ that connect the client 20 to the main office 40 and between the main office 40 and other offices including the satellite office 50. Each of the tunnels $35_1$ to $35_P$ is a portion of the connection in which the private data is encapsulated. Any tunneling technology may be used including Point-to-Point Tunneling Protocol (PPTP), Transport Layer Security (TLS) VPN, Layer Two Tunneling Protocol (L2TP), and Internet Security (IPSec) tunnel mode.

The main office 40 is the principal facility of an organization or a business entity. It is connected to the network 30 via a router/switch 45. It includes a remote VPN server 60 and L network devices $70_1$ to $70_L$. The remote VPN server 60 is a server that acts as a gateway to manage the network traffic to and from the network 30. The network devices $70_1$ to $70_L$ are any units that have functionalities for network communication. They may be a notebook personal computer (PC), a laptop PC, a desktop PC, a personal digital assistant (PDA), a mobile device, or any device that has a network interface and software to provide network communication.

The satellite office 50 is any branch office that is part of the organization having the main office 40 as the principal facility. It is connected to the network 30 via a router/switch 55. It is connected to the main office via the tunnel $35_P$. It includes a remote VPN server 80 and K network devices $90_1$ to $90_K$. The VPN server 80 and the K network devices $90_1$ to $90_K$ are similar to the VPN server 60 and the L network devices $70_1$ to $70_L$, respectively.

Figure 1B:
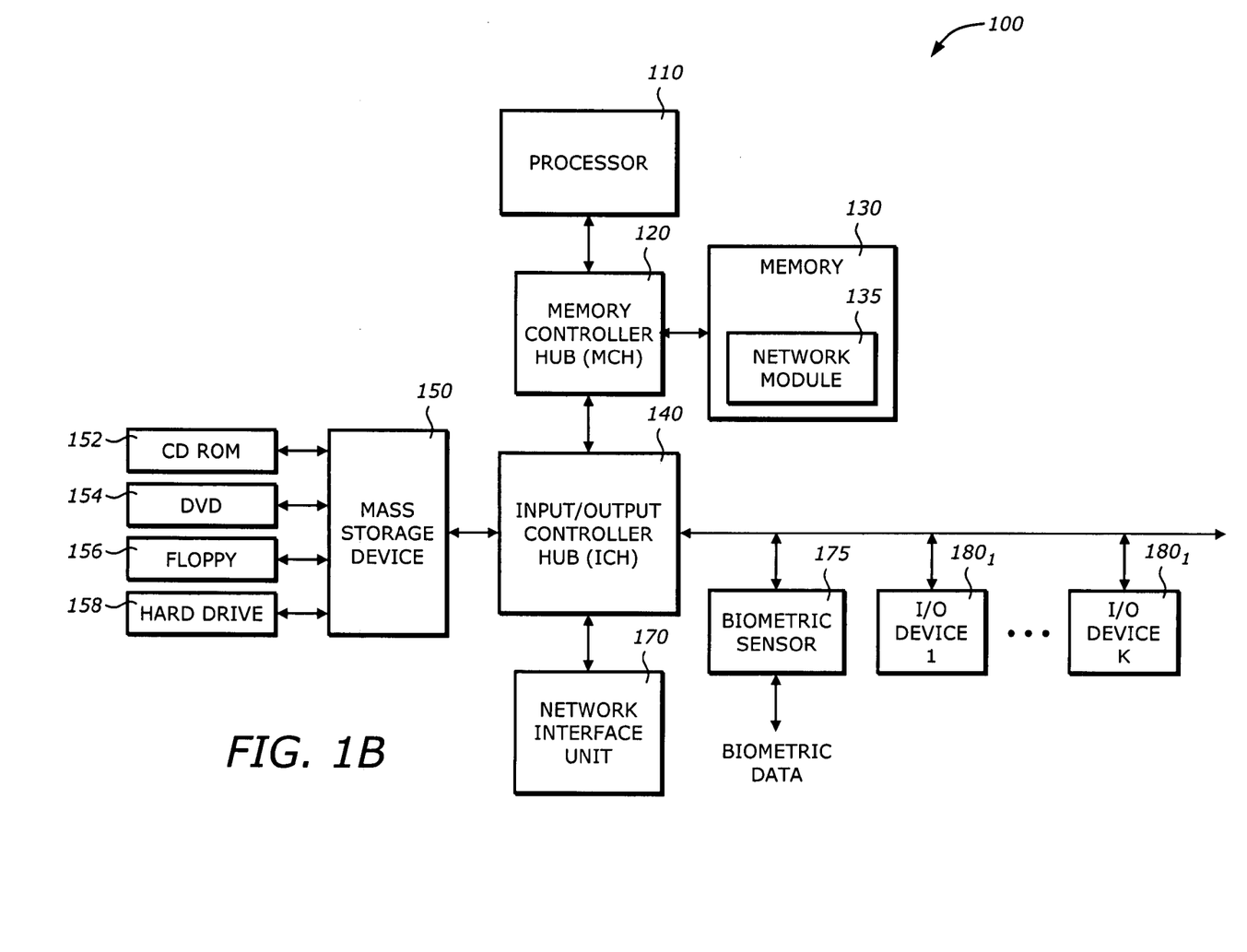
FIG. 1B is a diagram illustrating a client in which one embodiment of the invention can be practiced.

FIG. 1B is a diagram illustrating the client 20 in which one embodiment of the invention can be practiced. The client 20 includes a processor unit 110, a memory controller hub (MCH) 120, a main memory 130, an input/output controller hub (ICH) 140, an interconnect 145, a mass storage device 150, a network interface unit 170, a biometric sensor 175, and input/output (I/O) devices $180_1$ to $180_K$.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MCH 120 provides control and configuration of memory and input/output devices such as the main memory 130 and the ICH 140. The MCH 120 may be integrated into a chipset that integrates multiple functionalities such as graphics, media, host-to-peripheral bus interface, memory control, power management, etc. The MCH 120 or the memory controller functionality in the MCH 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 30 is typically implemented with dynamic random access memory (DRAM), static random access memory (SRAM), or any other types of memories including those that do not need to be refreshed. The main memory 130 may include a network module 135 that contains a program or instructions to perform network communication. In addition to standard network communication, it may provide a functionality that support the network interface unit 170 for a secure VPN communication between the client 20 and the main office 50.

The ICH 140 has a number of functionalities that are designed to support I/O functions. The ICH 140 may also be integrated into a chipset together or separate from the MCH 120 to perform I/O functions. The ICH 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, Institute of Electrical and Electronic Engineers (IEEE) 1394 interface (e.g., Firewire), mass storage interface, low pin count (LPC) interface, etc.

The interconnect 145 provides interface to peripheral devices. The interconnect 145 may be point-to-point or connected to multiple devices. For clarity, not all the interconnects are shown. It is contemplated that the interconnect 145 may include any interconnect or bus such as Peripheral Component Interconnect (PCI), PCI Express, Universal Serial Bus (USB), and Direct Media Interface (DMI), etc.

The mass storage device 150 stores archive information such as code, programs, files, data, and applications. The mass storage device 150 may include compact disk (CD) read-only memory (ROM) 152, digital video/versatile disc (DVD) 153, a floppy drive 154, and a hard drive 156, and any other semiconductor, magnetic, or optic storage devices including electronic disk (e.g., flash memories). The mass storage device 150 provides a mechanism to read machine-accessible media that contain instructions or programs to perform the functions described in the following such as a simulation.

The network interface unit 170 includes hardware and Firmware components to provide interface to the network 30 for network communication. It may provide general network communication and VPN communication. Together with the network module 135, it forms the dynamic VPN module 22 that provides secure VPN communication between the client 20 and the remote VPN server 60.

The biometric sensor 175 is a device that receives and processes biometric data such as fingerprint, iris, retinal pattern, voice, and face image of the user. It may be a fingerprint reader, an iris scanner, a voice recorder or audio receiver, or a camera. It is used to verify or authenticate the user for security purposes. The biometric sensor 175 may interface to a specialized circuit or module to perform the identity verification, or it may provide input data to a software module in the main memory 130 for processing. User authentication by any of the authentication devices may be used as a trigger for the Firmware in the network interface unit 170 to establish a VPN connection with the remote end. Note that the use of the biometric sensor 175 is optional.

The I/O devices 180$_1$ to 180$_K$ may include any I/O devices to perform I/O functions. Examples of I/O devices 180$_1$ to 180$_K$ include controller for input devices (e.g., keyboard, mouse, trackball, pointing device), media card (e.g., audio, video, graphic), and any other peripheral controllers.

Figure 2:
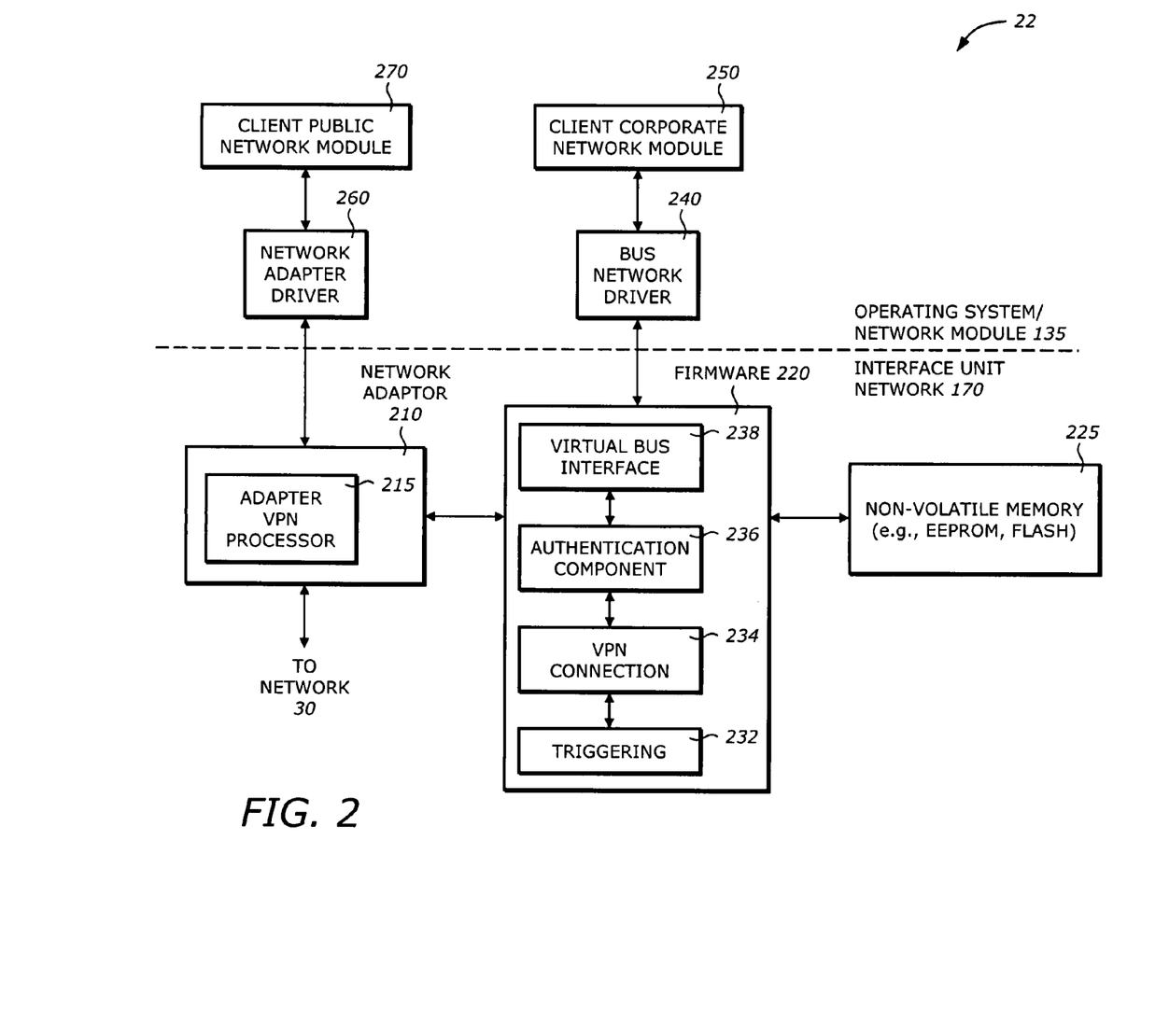
FIG. 2 is a diagram illustrating a dynamic VPN emulator according to one embodiment of the invention.

FIG. 2 is a diagram illustrating a dynamic VPN module 22 according to one embodiment of the invention. The dynamic VNP module 22 includes hardware, Firmware, and software components that operate together to provide VPN communication between the client 20 and the main office 50. It includes the network module 135 and the network interface unit 170 shown in FIG. 1B.

The network interface unit 170 includes hardware and Firmware components residing on the platform of the client 20. It includes a network adapter 210 and a Firmware 220. The network adapter 210 is any network interface card that interfaces to the network 30. It may have circuits to support wired or wireless connectivity. It may use an external transceiver or an internal integrated transceiver. It may contain the protocol control Firmware and Ethernet controller to support the MAC data link protocol used by the Ethernet. For wireless connectivity, it may have circuitry to provide Wi-Fi functionality including 801.11b compatibility. It may include an adapter VPN processor 215 that may execute instructions in the Firmware 220. The VPN processor 215 may be any suitable processor such as a microcontroller, a digital signal processor (DSP), etc. It may have access to a RAM in addition to the Firmware 220 for program execution.

The Firmware 220 is an electronic non-volatile memory (e.g., Flash memory) that contains programs or instructions executed by the adapter VPN processor 215 or the processor 10 shown in FIG. 1B. The execution of the instructions in the Firmware 220 is performed without using the OS software. In this manner, the VPN network information or data, including the network security components, is protected from malicious attack or reverse engineering. The Firmware 220 includes a triggering module 232, a VPN connection module 234, an authentication component 236, and a virtual bus interface 238. The Firmware 220 may also be interfaced to a non-volatile memory 225.

The triggering module 232 triggers the execution of the VPN connection module 234 after some security information is confirmed. This may be accomplished by verifying or authenticating the user's identity or providing a way to start the VPN communication without going through the OS. The user identity may be authenticated by processing the biometric data such as user's fingerprint, iris, voice, face image, etc. provided by the biometric sensor 175 (FIG. 1B), or by recognizing a pre-defined keyboard sequence (e.g, Ctrl+Alt+z) followed by an established password. Another way to trigger the execution of the VPN connection module 234 is to connect to a Web page which is exposed or intercepted through the network adapter 210 without going through the OS. For example, the network adapter may intercept an address called https://mypvn.

The VPN connection module 234 connects to the remote gateway without using the OS software. It may contain code that is similar to the network adapter driver provided by the network module 135 to establish a VPN connection with the remote gateway through the network 30. It also includes code to authenticate the user in a normal VPN log-in session using a number of authentication procedures consistent with the underlying tunneling technology. Some examples of the authentication method may include verifying user's password, confirming a digital certificate or other secret key provided by the authentication component 236, providing legacy authentication schemes such as Remote Authentication Dial-In User Service (RADIUS) with IPSec, Terminal Access Controller Access Control System (TACACS), TACACS+, etc., or combining multiple authentication methods using any of the standard protocols such as Extensible Authentication Protocol (EAP), IPSec, Internet Key Exchange (IKE) negotiation, etc.

The authentication component 236 is a secret used for authenticating the user in a normal VPN log on session. It may be a digital certificate or some other secret key. It may include symmetric (or private) key, or asymmetric (or public) key for encryption/decryption. Any suitable encryption scheme may be used such as the Rivest Shamir Adleman (RSA) Rivest Cipher 4 (RC4) algorithm, Date Encryption Standard (DES), the International Encryption Algorithm (IDEA), etc.

The virtual bus interface 238 provides interface to the network module 135 through the bus interface port. The bus interface port may be any port that has Plug-and-Play functionality. In one embodiment, the bus port is a Universal Serial Bus (USB) port having a Plug-and-Play (PnP) functionality. The USB and the PnP specification is provided in the document "Universal Serial Bus Specification", written by Compaq, Hewlett Packard, Intel, Lucent, Microsoft, NEC and Philips, Revision 2.0, dated Apr. 27, 2000. Other bus interfaces may be used such as parallel bus, IEEE 1394, etc. The virtual bus interface 238 emulates or simulates a USB PnP event of plugging a new USB Ethernet network adapter. It may generate an event to notify a bus network driver in the network module 135 its presence or appearance. In one embodiment, the event is a USB Plug-and-Play (PnP). The Firmware 220 may also respond to a request from the network module 240 to provide the network information such as the network address and Domain Name System (DNS) information.

The non-volatile memory 225 may be an EEPROM or a flash memory. It may contain code of the modules in the Firmware 220. In essence, the modules in the Firmware 220 interact with the OS network driver via the bus interface port to operate as a standard network interface so that there is no need to re-write the OS network communication programs or drivers. This enables the client network software in the network module 135 in communicating with the remote L network devices $90_1$ to $90_K$. The Firmware 220 may be written to inter-operate or be compatible with many major VPN remote server software.

The network module 135 includes several components as part of the OS or application programs that run on the OS. It includes a bus network driver 240, a client corporate network module 250, a network adapter driver 260, and a client public network module 270. The bus network driver 240 is a software driver that interfaces to a bus port used for communication with the Firmware 220. In one embodiment, the bus port is the USB port having a PnP functionality. The bus network driver 240 interacts with the virtual bus interface module 238 to during a PnP event. Upon receiving a notification from the virtual bus interface 238 indicating that a new USB network adapter is plugged in, it sends a request to obtain the network information such as the network address and DNS information. The request may be processed by the Firmware 220 or by the remote L network devices $70_1$ to $70_L$. The client corporate network module 250 may be an application program that provides network communication between the client and the corporate entity such as the main office 40 shown in FIG. 1A. The network adapter driver 260 is a software driver that manages the network adapter 210. The client public network module 270 is an application program that manages the communication between the client 20 and the network 30. In a typical scenario, these modules are standard components available in existing application programs or OS. Therefore, it is not necessary to add, modify, or rewrite these modules. All packets that are transported over the emulated USB network adapter are encapsulated and transported over the real physical network link, such as the transport layer security (TLS) VPN encapsulation.

Figure 3:
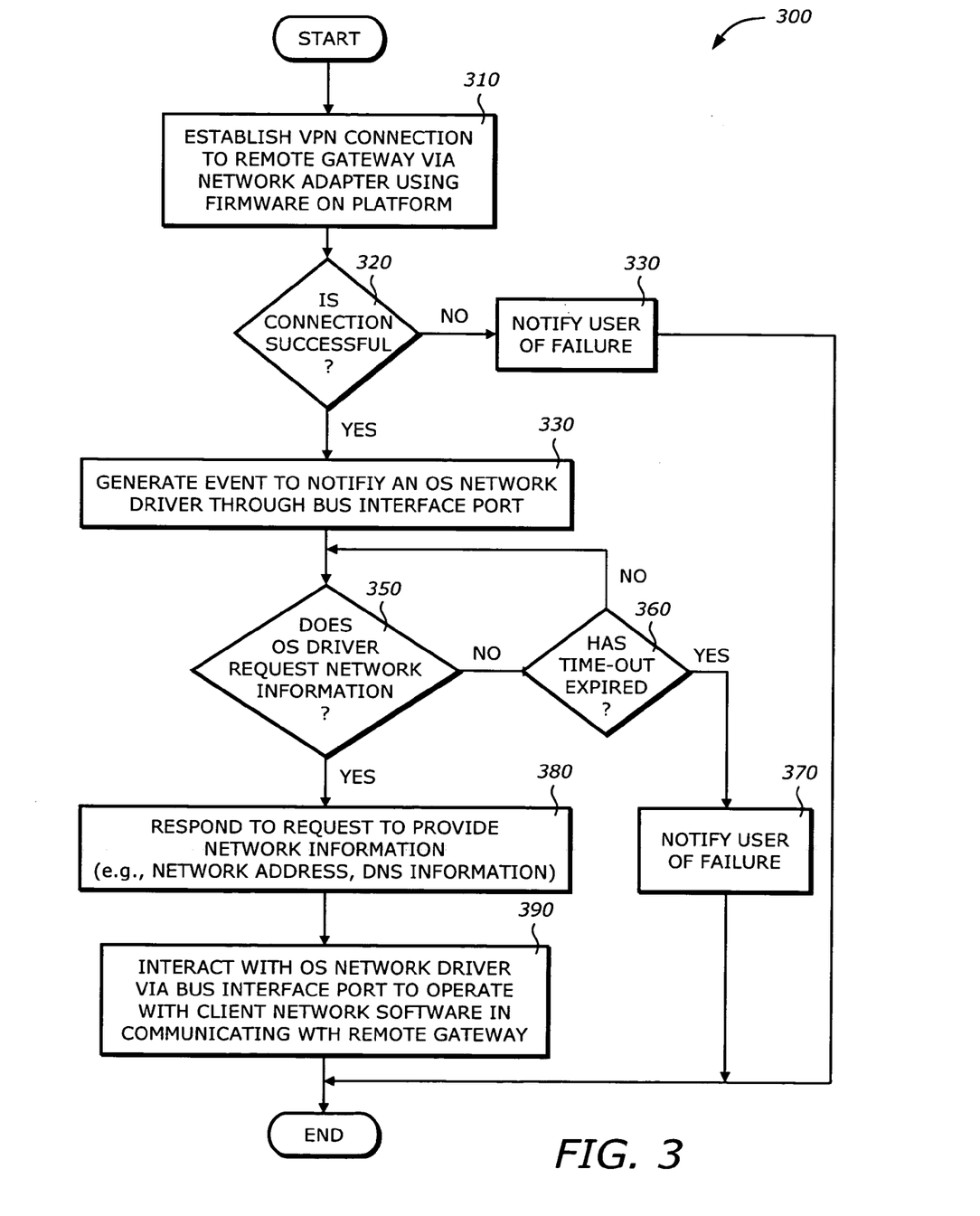
FIG. 3 is a flowchart illustrating a process to create a VPN according to one embodiment of the invention.

FIG. 3 is a flowchart illustrating a process 300 to create a VPN according to one embodiment of the invention.

Upon START, the process 300 establishes a VPN connection to a remote gateway via a network adapter using a Firmware on the platform without using, or independently of, the OS (Block 310). The remote gateway may be a network server located at a remote site such as a corporate office. The Firmware may be an integrated circuit storage element (e.g., Flash memory) that is installed on the platform as shown in FIG. 2. Next, the process 300 determines if the VPN connection is successful (Block 320). If not, the process 300 notifies the user of the failure (Block 330). This may be performed by generating an error status indicator (e.g., blinking light) at an input device (e.g., a biometric module) or a message displayed on the client display. If the connection is successful, the process 300 generates an event to notify an OS network driver through a bus interface port (Block 340). The bus interface port may be a USB port and the event may be a USB PnP event. The event may indicate that a VPN emulator Firmware is present in the system.

Then, the process 300 determines if the OS driver requests network information for the VPN communication (Block 350). If not, the process 300 determines if a time-out period has expired (Block 360). If so, the process 300 notifies the user of the failure (Block 370) and is then terminated. Otherwise, the process 300 returns to Block 350 to continue determining if the OS driver requests for network information. If the OS driver requests network information, the process 300 responds to the request to provide the network information (Block 380). The network information may include a network address and the DNS information. Next, the process 300 interacts with the OS network driver via the bus interface port to operate with the client network software in communicating with the remote gateway (Block 390) and is then terminated.

Figure 4:
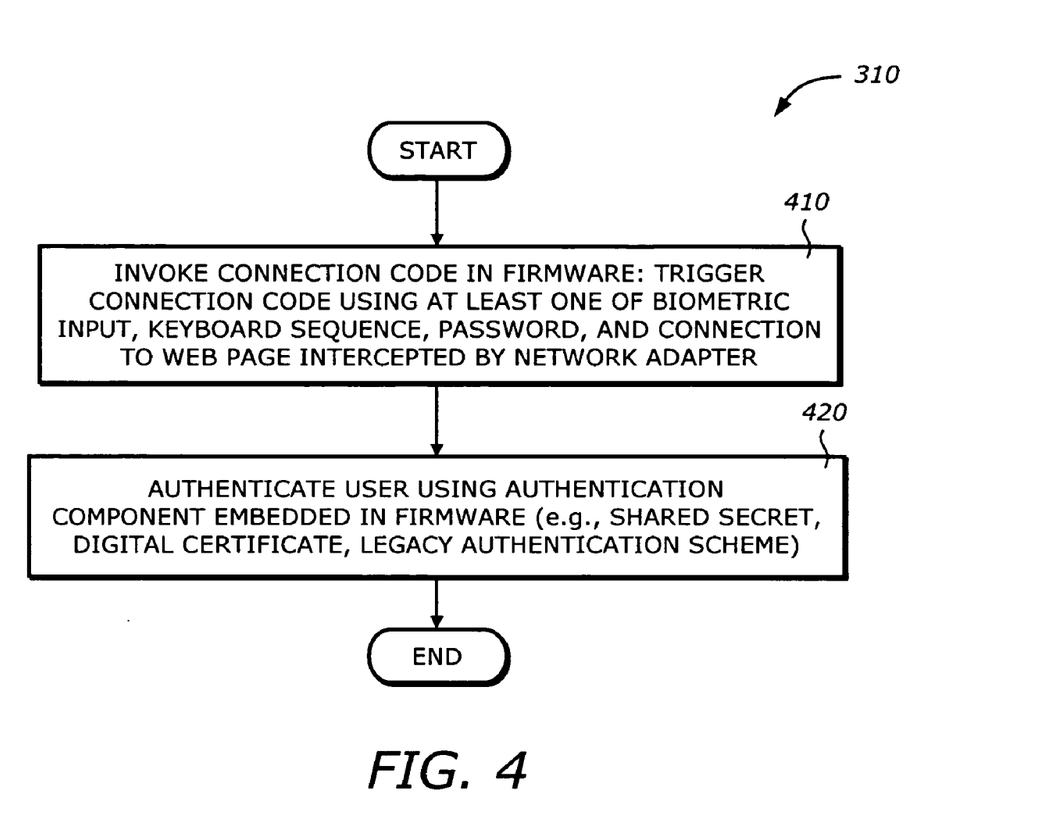
FIG. 4 is a flowchart illustrating a process to establish a VPN connection according to one embodiment of the invention.

FIG. 4 is a flowchart illustrating the process 310 to establish a VPN connection according to one embodiment of the invention. The process 310 is a function in the process 300 shown in FIG. 3.

Upon START, the process 310 invokes an execution code in the Firmware (Block 410). This may be performed by triggering the execution code using at least one of an identity verification, a biometric input, a pre-determined keyboard sequence with or without an accompanying password, and a connection to a Web page intercepted by the network adapter. The biometric input may be any suitable biometric input used for identification of the user such as fingerprint, iris, retinal pattern, voice, face image, etc.

Next, the process 310 authenticates the user using an authentication component embedded in the Firmware (Block 420). The user authentication is performed as part of the VPN communication. The authentication component may include shared secrets (e.g., password), digital certificate, or any legacy authentication scheme. The process 310 is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    establishing a virtual private network (VPN) connection to a remote gateway using a network adapter executing Firmware stored on a non-volatile memory device coupled with the network adapter, wherein the network adapter establishes the VPN connection independent of an operating system (OS) of a platform including the network adapter and without using an OS network driver of the OS of the platform, wherein the network adapter includes a processor element for executing the Firmware;

generating an event by the network adapter executing the Firmware to notify the OS network driver through a bus interface port of the platform that the VPN connection has been established by the network adapter; and responding to a request from the OS network driver to provide network information so that the OS network driver can take over control of communications with the remote gateway over the VPN connection established by the network adapter.

2. The method of claim 1 wherein establishing the VPN connection comprises:

invoking a connection code in the Firmware; and authenticating a user using an authentication component embedded in the Firmware, wherein the authenticating is performed by the network adapter executing the Firmware independent of the OS.

3. The method of claim 2 wherein invoking the connection code comprises:

triggering the connection code using at least one of an identity verification, a biometric input, a keyboard sequence, a password, and a connection to a Web page intercepted by the network adapter.

4. The method of claim 2 wherein authenticating comprises:

authenticating the user using the authentication component being one of a shared secret, a digital certificate, and a legacy authentication scheme.

5. The method of claim 1 wherein generating the event comprises:

generating the event being a Plug-and-Play (PnP) event through a universal serial bus (USB) interface port.

6. The method of claim 1 wherein responding comprises:

responding to the request to provide at least one of a network address and Domain Name System (DNS) information.

7. The method of claim 1 further comprising:

interacting with the OS network driver via the bus interface port to operate with a client network software in communicating with the remote gateway.

8. An article of manufacture comprising:

a machine-accessible medium including data that, when accessed by a machine, cause the machine to perform operations comprising:

establishing a virtual private network (VPN) connection to a remote gateway using a network adapter executing Firmware, wherein the network adapter establishes the VPN connection independent of an operating system (OS) of a platform including the network adapter and without using an OS network driver of the OS of the platform;

generating an event by the network adapter to notify the OS network driver through a bus interface port of the platform that the VPN connection has been established by the network adapter; and responding to a request from the OS network driver to provide network information so that the OS network driver can take over control of communications with the remote gateway over the VPN connection established by the network adapter.

9. The article of manufacture of claim 8 wherein the data causing the machine to perform establishing the VPN connection comprises data that, when accessed by a machine, cause the machine to perform operations comprising:

invoking a connection code in the Firmware on the platform; and authenticating a user using an authentication component embedded in the Firmware.

10. The article of manufacture of claim 9 wherein the data causing the machine to perform invoking the connection code comprises data that, when accessed by a machine, cause the machine to perform operations comprising:

triggering the connection code using at least one of an identity verification, a biometric input, a keyboard sequence, a password, and a connection to a Web page intercepted by the network adapter.

11. The article of manufacture of claim 9 wherein the data causing the machine to perform authenticating comprises data that, when accessed by a machine, cause the machine to perform operations comprising:

authenticating the user using the authentication component being one of a shared secret, a digital certificate, and a legacy authentication scheme.

12. The article of manufacture of claim 8 wherein the data causing the machine to perform generating the event comprises data that, when accessed by a machine, cause the machine to perform operations comprising:

generating the event being a Plug-and-Play (PnP) event through a universal serial bus (USB) interface port.

13. The article of manufacture of claim 8 wherein the data causing the machine to perform responding comprises data that, when accessed by a machine, cause the machine to perform operations comprising:

responding to the request to provide at least one of a network address and Domain Name System (DNS) information.

14. The article of manufacture of claim 8 further comprising data that, when accessed by a machine, cause the machine to perform operations comprising:

interacting with the OS network driver via the bus interface port to operate with a client network software in communicating with the remote gateway.

15. A system comprising:

a network adapter on a platform coupled to a network, the network adapter having a processor;

a Firmware coupled to the network adapter, the Firmware containing instructions that, when executed by the processor, cause the processor to:

establish a virtual private network (VPN) connection to a remote gateway using the network adapter executing the Firmware, wherein the network adapter establishes the VPN connection independent of an operating system (OS) of the platform and without using an OS network driver of the OS, generate an event by the network adapter executing the Firmware to the OS network driver through a bus interface port of the platform that the VPN connection has been established by the network adapter, and respond to a request from the OS network driver to provide network information so that the OS network driver can take over control of communications with the remote gateway over the VPN connection established by the network adapter.

16. The system of claim 15 wherein the instructions causing the processor to establish the VPN connection comprises instructions that, when executed by the processor, cause the processor to:

invoke a connection code; and authenticate a user using an authentication component embedded in the Firmware.

17. The system of claim 16 wherein the instructions causing the processor to invoke the connection code comprises instructions that, when executed by the processor, cause the processor to:

trigger the connection code using at least one of an identity verification, a biometric input, a keyboard sequence, a password, and a connection to a Web page intercepted by the network adapter.

18. The system of claim 16 wherein the instructions causing the processor to authenticate comprises instructions that, when executed by the processor, cause the processor to:
   authenticate the user using the authentication component being one of a shared secret, a digital certificate, and a legacy authentication scheme.

19. The system of claim 15 wherein the instructions causing the processor to generate the event comprises instructions that, when executed by the processor, cause the processor to: generate the event being a Plug-and-Play (PnP) event through a universal serial bus (USB) interface port.

20. The system of claim 15 wherein the instructions causing the processor to respond comprises instructions that, when executed by the processor, cause the processor to:
   respond to the request to provide at least one of a network address and Domain Name System (DNS) information.

* * * * *